US006498271B2

(12) United States Patent
Mobley et al.

(10) Patent No.: US 6,498,271 B2
(45) Date of Patent: Dec. 24, 2002

(54) TRICARBOXYLIC ACIDS, METHOD, AND BRANCHED POLYCARBONATES PREPARED THEREFROM

(75) Inventors: David Paul Mobley, Niskayuna, NY (US); Mohan Mark Amaratunga, Clifton Park, NY (US); John Henry Lobos, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/041,996

(22) Filed: Jan. 10, 2002

(65) Prior Publication Data

US 2002/0169339 A1 Nov. 14, 2002

Related U.S. Application Data

(62) Division of application No. 09/814,484, filed on Mar. 20, 2001.

(51) Int. Cl.[7] .......................... C07C 55/00; C07C 61/00
(52) U.S. Cl. ........................................ 562/590; 562/400
(58) Field of Search ................................ 562/590, 400

(56) References Cited

U.S. PATENT DOCUMENTS

| 4,217,438 A | 8/1980 | Brunelle et al. |
| 4,948,871 A | 8/1990 | Fukuoka et al. |
| 5,204,377 A | 4/1993 | Fukowa et al. |
| 5,266,659 A | 11/1993 | Sivaram et al. |
| 5,288,838 A | 2/1994 | Sivaram et al. |
| 5,414,057 A | 5/1995 | Campbell et al. |
| 5,620,878 A | 4/1997 | Picataggio et al. |
| 5,717,056 A | 2/1998 | Varadarajan et al. |
| 5,756,843 A | 5/1998 | Webb et al. |
| 5,962,285 A | 10/1999 | Anderson et al. |

OTHER PUBLICATIONS

EN Frankel and EH Pryde, "Catalytic Hydroformylation and Hydrocarboxylation of Unsaturated Fatty Compounds", Journal of the American Oil Chemist's Society, vol. 55, pp. 873A–881A (1977).
EN Frankel and EH Pryde, "Catalytic Carboxylation of Fats. Carboxy Acids and Esters From Monounsaturates", Journal of the American Oil Chemist's Society, vol. 50, pp. 39–43 (1973).
Tsai et al, J. Org. Chem., 1980, 45, pp. 4785–4786.*
Tsai et al, J. Org. Chem., 1980, , 45, (23) pp. 4785–4786.*

* cited by examiner

*Primary Examiner*—Alan L. Rotman
*Assistant Examiner*—Hector M. Reyes
(74) *Attorney, Agent, or Firm*—S. Bruce Brown; Noreen C. Johnson

(57) ABSTRACT

Aliphatic tricarboxylic acids, as exemplified by 9-carboxy-1,18-octadecanedioic acid, may be prepared by the biotransformation of an olefinic monocarboxylic acid such as oleic acid to the corresponding olefinic dicarboxylic acid, preferably 1,18-octadec-9-enedioic acid, in the presence of a strain of yeast, such as a strain of *Candida tropicalis,* followed by the carboxylation of the olefinic dicarboxylic acid by reaction with carbon monoxide and water in the presence of a catalyst. The product tricarboxylic acids are useful as branching agents for polycarbonates.

6 Claims, No Drawings

TRICARBOXYLIC ACIDS, METHOD, AND BRANCHED POLYCARBONATES PREPARED THEREFROM

This application is a division of application Ser. No. 09/814,484, filed Mar. 20, 2001 which is hereby incorporated by reference in its entirety.

BACKGROUND OF THE INVENTION

This invention relates to the preparation of branched polycarbonates. More particularly, it relates to new tricarboxylic acid branching agents and the polycarbonates derived therefrom.

Polycarbonate resins are a well known class of synthetic polymeric resins which may be prepared by various methods including the reaction of a dihydroxy compound, preferably a dihydroxyaromatic compound, with a carbonate precursor; see for example U.S. Pat. No. 3,028,365. For certain purposes such as blow molding, branched polycarbonates are superior to the linear polymers by reason of their melt rheology behavior. In particular, they exhibit high melt elasticity and high melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. These advantageous properties of the branched resins are in large part a result of their non-Newtonian flow characteristics.

In the typical preparation of branched polycarbonates, a linear polycarbonate or its precursor undergoes reaction with a branching agent. Commonly employed branching agents include 1,1,1-tris(4-hydroxyphenyl)ethane (THPE) and trimellityl trichloride (TMTC). However, THPE is very expensive, partly by reason of its method of preparation in which an essential reactant is the expensive 4-hydroxyacetophenone. Branched polycarbonates prepared with TMTC are photochemically unstable.

It is of interest, therefore, to provide new branching agents which are relatively inexpensive. In one embodiment of the present invention, aliphatic branching agents are produced by a series of reactions which can include a biosynthesis step. This series of reactions has potential for being very inexpensive to conduct. The product is an aliphatic tricarboxylic acid which is capable of being used to produce branched polycarbonates having excellent properties.

SUMMARY OF THE INVENTION

One aspect of the invention is aliphatic tricarboxylic acids having the formula

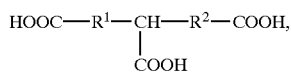

wherein each of $R^1$ and $R^2$ is independently a divalent aliphatic hydrocarbon radical containing about 5–10 carbon atoms.

Another aspect of the invention is a process for making an aliphatic tricarboxylic acid having the formula

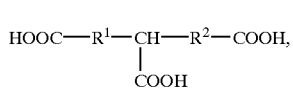

wherein each of $R^1$ and $R^2$ is independently a divalent aliphatic hydrocarbon radical containing about 5–10 carbon atoms, which comprises the steps of (a) converting an olefinic monocarboxylic acid to an olefinic dicarboxylic acid by biotransformation in the presence of a yeast, such as strains of *Candida tropicalis;* and (b) carboxylating the olefinic dicarboxylic acid to a tricarboxylic acid with carbon monoxide and water in the presence of a catalyst.

Still another aspect of the invention is branched polycarbonates comprising structural units of the formula

wherein each A is independently a divalent aliphatic, alicyclic or aromatic radical, and branching units of formula III derived from at least one compound of formula I:

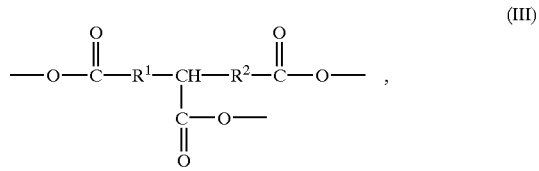

wherein $R^1$ and $R^2$ are as previously defined.

DETAILED DESCRIPTION; PREFERRED EMBODIMENTS

The $R^1$ and $R^2$ radicals in the tricarboxylic acids of this invention are divalent aliphatic hydrocarbon radicals containing about 5–10 carbon atoms. Most often, each of $R^1$ and $R^2$ is a straight chain alkylene radical. In preferred embodiments $R^1$ is —$(CH_2)_7$— and $R^2$ is —$(CH_2)_8$—. Thus, the preferred tricarboxylic acid is 9-carboxy-1,18-octadecanedioic acid, hereinafter sometimes designated "CODDA".

The tricarboxylic acids of the invention may be prepared from olefinic monocarboxylic acids, preferably oleic acid, by a two-step reaction sequence. The first step is the biotransformation of the olefinic monocarboxylic acid to the corresponding olefinic dicarboxylic acid, preferably 1,18-octadec-9-enedioic acid. This biotransformation occurs in the presence of various strains of yeast, including strains of *Candida tropicalis,* as disclosed in U.S. Pat. Nos. 5,620,878 and 5,962,285, the disclosures of which are incorporated by reference herein. As noted in those patents, a preferred strain of *C. tropicalis* for this purpose is designated AR40 and that strain was deposited Mar. 9, 1990, with the American Type Culture Collection as ATCC 20987.

The second step is the carboxylation of the olefinic dicarboxylic acid to the acid of formula I. Such carboxylation may be effected by reaction of the olefinic dicarboxylic acid, preferably 1,18-octadec-9-enedioic acid, with carbon monoxide and water in the presence of a catalyst, typically one comprising a transition metal or a noble metal and a ligand, such as palladium chloride-triphenylphosphine. A typical reaction is disclosed in Frankel et al., *J. Am. Oil Chem. Soc.*, 50, 39–43 (1973), the disclosure of which is incorporated herein by reference. Following preparation, the tricarboxylic acid product may be isolated by conventional means.

The tricarboxylic acids of the invention may also be prepared by catalytic carboxylation of oleic acid, followed by biotransformation. It is believed, however, that the preferred method employs biotransformation as the first step.

The A value in the branched polycarbonates of this invention, occurring in the structural units therein having formula II, may be the same or said polycarbonates may contain two or more different units of that formula. Said A values may be aliphatic, alicyclic, aromatic or mixed; those which are aliphatic or alicyclic generally contain up to about 8 carbon atoms. Suitable A values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These moieties may be substituents such as chloro, nitro, alkoxy and the like, and also linking radicals such as oxy, thio, sulfoxy, sulfone, ester, amide, ether and carbonyl. Most often, however, all A radicals are hydrocarbon radicals.

Preferably at least about 60% and more preferably at least about 80% of the total number of A values in the mixtures, and most desirably all of said A values, are aromatic. The aromatic A radicals preferably have the formula

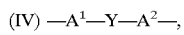
(IV) —A$^1$—Y—A$^2$—, wherein each of A$^1$ and A$^2$ is a monocyclic divalent aromatic radical and Y is a bridging radical in which one or two atoms separate A$^1$ from A$^2$. The free valence bonds in formula IV are usually in the meta or para positions of A$^1$ and A$^2$ in relation to Y.

The A$^1$ and A$^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both A$^1$ and A$^2$ are preferably p-phenylene, although both may be o- or m-phenylene or one o- or m-phenylene and the other p-phenylene.

The bridging radical, Y, is one in which one or two atoms, preferably one, separate A$^1$ from A$^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred units of formula IV are 2,2-bis(4-phenylene)propane carbonate units, which are derived from bisphenol A and in which Y is isopropylidene and A$^1$ and A$^2$ are each p-phenylene.

Said branched polycarbonates may be prepared by conventional polycarbonate synthesis methods such as interfacial, transesterification and redistribution methods, or by solid state polymerization as described, for example, in U.S. Pat. Nos. 4,948,871, 5,204,377, 5,266,659 and 5,288,838, the disclosures of which are incorporated by reference herein. All of these methods are the subject of many issued patents and publications, and need not be described in detail herein.

In interfacial and transesterification procedures, the at least one tricarboxylic acid of the invention is typically part of the reaction mixture which includes phosgene or a diaryl carbonate. In redistribution procedures, a tricarboxylic acid is typically added to the polymer to be redistributed. In solid state procedures, a tricarboxylic acid may be incorporated in a reaction mixture which includes a polycarbonate oligomer, with a crystallinity enhancing operation preceding or following incorporation of the acid. The proportion of the at least one tricarboxylic acid employed will depend on the extent of branching desired; most often about 0.05–7.0 mole percent and preferably about 0.1–5.0 mole percent of total tricarboxylic acid based on dihydroxy compound structural units is suitable.

The preparation of the branched polycarbonates of this invention by solid state polymerization employs a precursor polycarbonate as a reactant. Suitable precursor polycarbonates may be prepared by the first step of a melt polycarbonate process or by bischloroformate oligomer preparation followed by hydrolysis and/or endcapping and isolation. Such oligomers most often have an intrinsic viscosity in the range of about 0.06–0.30 deciliters per gram (dl/g), all intrinsic viscosity values herein being as determined in chloroform at 25° C.

The precursor polycarbonate may also be a high molecular weight homo- or copolycarbonate; i.e., one having an intrinsic viscosity above 0.30 dl/g. Numerous kinds of suitable high molecular weight homo- and copolycarbonates are suitable, including conventional linear polycarbonates in virgin form. They may be prepared from any of the known dihydroxy compounds useful as monomers, including dihydroxyaromatic compounds such as bisphenol A, SBI and others designated by name or structural formula (generic or specific) in U.S. Pat. No. 4,217,438.

Recycled polycarbonates, for example from compact disks, may also be employed as precursor polycarbonate. Such recycled material typically has a molecular weight which has been degraded from that of the originally polymerized material as shown by an intrinsic viscosity in the range of about 0.25–1.0 dl/g. It may he obtained from scrap polycarbonate by dissolution in a chlorinated organic solvent such as chloroform, methylene chloride or 1,2-dichloroethane followed by filtration of the insoluble material or by other art-recognized procedures for separation of non-polycarbonate constituents. Other types of polycarbonate, such as interfacially prepared polycarbonate and polycarbonate extruder wastes, may also be employed as precursors.

The precursor polycarbonate and at least one tricarboxylic acid of this invention are brought into contact under conditions promoting reaction between them. Such conditions generally involve temperatures in the range of about 170–250° C., frequently including staged heating at progressively increasing temperatures. The conditions may be those known in the art to be effective to enhance the crystallinity of the precursor polycarbonate; if not, a subsequent crystallinity enhancement step may be performed. Said conditions may include progressively decreased pressures, starting at atmospheric and terminating at about 100 torr or even lower, although decreasing pressure is not always necessary or even preferred. Diaryl carbonates such as diphenyl carbonate may also be present to provide conditions for an increase in molecular weight.

It is usually preferred, sometimes even necessary, to employ a catalyst during the branching step. Suitable catalysts include those effective in such polycarbonate reactions as melt polymerization, redistribution, equilibration and solid state polymerization. A wide variety of bases and Lewis acids are useful for this purpose. They include the catalysts disclosed in U.S. Pat. Nos. 5,414,057 and 5,717,056, the disclosures of which are incorporated by reference herein. Examples are alkali metal hydroxides and alkoxides; metal, especially alkali metal, hydrides and borohydrides; organotin and organotitanium compounds; aliphatic and heterocyclic amines; phosphines; and tetraalkylammonium and tetraalkylphosphonium hydroxides, alkoxides, carboxylates and tetraphenylborates. Also included are quaternary bisphenolates such as those disclosed in U.S. Pat. No. 5,756,843, all of said patents being incorporated by reference herein. The quaternary bisphenolates may be represented by the formula

wherein A is unsubstituted p-phenylene, Q is a monocationic carbon- and nitrogen-containing moiety containing 9–34 atoms and Y is a bridging radical in which one or two carbon atoms separate the A values. Particularly suitable quaternary bisphenolates are those in which Y is isopropylidene and Q is a hexaalkylguanidinium cation, especially hexaethylguanidinium.

The product of the branching step is a branched polycarbonate precursor, generally of enhanced crystallinity. The solid state polymerization step may be effected thereon (or, if necessary, after a conventional crystallinity enhancement step) at a temperature between the glass transition temperature and the melting temperature of the enhanced crystallinity polycarbonate precursor, most often about 10–50° C. below its melting temperature. In general, temperatures in the range of about 150–270° and especially about 180–250° C. are suitable.

As disclosed in U.S. Pat. No. 4,948,871 and the aforementioned U.S. Pat. Nos. 5,204,377 and 5,717,056, the solid state polymerization step may be achieved in the absence or presence of catalysts. When present, catalysts may often be the same as those employed in the branching step and may function in both steps without further catalyst addition.

Solid state polymerization may be conducted in a mixer capable of producing intimate gas-solid contact, such as a fixed bed, fluidized bed or paddle mixer, in contact with an inert gas such as nitrogen or argon which serves as the fluidizing gas if a fluidized bed is employed. Said inert gas may serve one or both of the purposes of fluidizing the mixture, and volatilizing and removing by-products, including water, hydroxyaromatic compound (such as phenol) corresponding to the carbonate employed to produce the branched precursor copolycarbonate, and any volatile carbonate formed as a by-product. Programmed heating may be advantageously employed. As an alternative to conditions of intimate gas-solid contact, the polymerization may be conducted at reduced pressure, typically less than about 100 torr, preferably with efficient mixing.

Ester unit s may be incorporated in the polycarbonate by the use of a corresponding dicarboxylic acid or acid chloride in an interfacial procedure or the use of a dialkyl or diaryl, most often a diphenyl, ester of said acid in a melt or solid state procedure.

THE INVENTION IS ILLUSTRATED BY THE FOLLOWING NONLIMITING EXAMPLES.

EXAMPLE 1

1,18-Octadec-9-enedioic acid was prepared by the action of C. tropicalis AR40 on oleic acid, generally as described in Example 9 of U.S. Pat. No. 5,620,878.

To a solution of 112 grams (g) of 1,18-octadec-9-enedioic acid in 52 milliliters (ml) of acetone were added 7.8 g of water, 300 milligrams (mg) of palladium(II) chloride and 1.8 g of triphenydphosphine. The resulting mixture was charged to an autoclave fitted with a stirrer, purged three times with 13.6 atmospheres (atm) of carbon monoxide and pressurized to 197.3 atm with carbon monoxide and heated at 150° C. with stirring , whereupon the pressure increased to about 259 atm. Carbon monoxide pressure was restored as needed for two hours, after which the autoclave was cooled and vented. The reaction mixture was removed by washing with acetone and the acetone was stripped by purging with nitrogen.

The recovered solid was dissolved in aqueous potassium hydroxide solution, with heating and stirring, and centrifuged to remove insoluble by-products. The resulting liquid was acidified to a pH of about 2 by the addition of concentrated sulfuric acid and extracted twice with ethyl ether. The extracts were washed four times with about 100 ml of water and stripped by passage of dry nitrogen. The residue was dissolved in ethyl acetate and heptane was added. The mixture was heated for 2–3 minutes in a boiling water bath and cooled, whereupon two phases formed. Heptane washing o f the ethyl acetate layer was repeated five times, after which the remaining ethyl acetate was removed by stripping with nitrogen to yield about 7 g of the desired CODDA, m.p. 72–750C. The structure was confirmed by proton and carbon-13 nuclear magnetic resonance spectroscopy.

EXAMPLE 2

A 500-ml 5-necked round-bottomed flask was charged with 19.5 g of bisphenol A, 544 mg of p-cumyl phenol, 119 mg of CODDA (0.37 mole percent based on bisphenol A), 150 ml of methylene chloride, 50 ml of water, and 200 microliters of triethylamine. The flask was fitted with a gas inlet tube, mechanical stirrer, caustic addition tube, condenser and pH electrode connected to a caustic pump. The top of the condenser was connected to two caustic traps in series.

Phosgene, 1.2 equivalents, was delivered to the reaction system at 500 milligrams per minute, while maintaining the pH at 8.0 for the first 10 minutes and 10.5 for the remainder of the reaction by addition of 33% aqueous sodium hydroxide solution. When the total delivered phosgene was 10.1 g, the reaction was stopped. The nitrogen purge was turned back on and the reaction mixture stirred for an additional 10 minutes. The organic phase was separated from the brine layer and washed two times with 1 N hydrochloric acid and four times with deionized water. The desired branched polycarbonate was finally isolated by precipitation into methanol and dried.

EXAMPLE 3

The procedure of Example 2 was repeated, except that 139 mg of CODDA (0.43 mole percent based on bisphenol A) was employed. A similar product was obtained.

EXAMPLE 4

The weight average molecular weights, Mw, of the products of Examples 2–3 were determined by gel permeation chromatography and their R* values were determined as follows:

First, the complex viscosities (eta*, η*) were generated at 1 radian per second (rad/sec) and 100 rad/sec, using a dynamic rheometer such as a model RDS 7700 (Rheometrics Inc.), and plotted against temperature with a n interval of about 1° C. Then, the R* temperature was found on the plot of viscosity vs. temperature, as that temperature at which the complex viscosity (η*) at 100 rad/sec was 20,000 poise.

Then, the value of the complex viscosity (η*) at 1 rad/sec at the R* temperature, T*, was determined and R* was calculated as the ratio of complex viscosity (η*) at 1 rad/sec to complex viscosity (η*) at 100 rad/sec (20,000 poise).

Branched polycarbonate resins useful for blow molding usually have an R* value of from about 2.2 to about 4.5. A linear polycarbonate usually has an R* value of about 1.45. The values for the products of Examples 2–3 were compared with those of a control prepared with the use of 0.37 mole percent of TBPE as a branching agent.

The results are given in the following table.

| Example | Mw | R* | T*, ° C. |
|---------|--------|-----|----------|
| 2 | 70,000 | 3.3 | 285 |
| 3 | 67,000 | 3.5 | 292 |
| Control | 74,000 | 4.1 | 301 |

It is apparent that the branched polycarbonates of the invention have similar molecular weights and viscosity properties to those of the control.

EXAMPLE 5

A bisphenol A polycarbonate oligomer (25 g, 98.4 millimoles [mmol]) having a Mw of about 9,000 and a number average molecular weight (Mn) in the range of about 4,000–4,500, prepared by melt polymerization, was combined with 316 mg (1.476 mmol) of diphenyl carbonate, 176 mg (0.492 mmol) of CODDA and 2.5 mg of antimony oxide (Sb$_2$O$_3$; 2.5 mg) in a glass reactor equipped for mechanical stirring. The mixture was heated at 210° C. for 20 minutes in a nitrogen atmosphere. The melt was then scooped from the reaction vessel with the aid of a spatula and allowed to cool to room temperature. This afforded a semi-crystalline mass which was ground and put through a sieve to remove particles having, dimensions smaller than about 0.42 mm. (The "fines" produced in the process were fully recyclable and could be recycled to subsequent melt mixing stages.) The remaining material had a melting point (Tm) of 225° C.

The material was then subjected to solid state polymerization in a nitrogen atmosphere according to the following protocol:

190° C., 4 hours,
220° C., 2 hours,
230° C., 2 hours,
240° C., 2 hours.

The product, which was removed from the reactor, was the desired branched polycarbonate having a glass transition temperature (Tg) of 143° C., a Tm of 273° C., a Mw of 35,850 and a Mn of 12,535.

EXAMPLE 6

The oligomer employed in Example 5 (25.146 g, 99 mmol) was combined with 642 mg (3 mmol) of diphenyl carbonate, 358 mg (1 mmol) of CODDA and 3 mg of Sb$_2$O$_3$ in a glass reactor equipped for mechanical stirring, and the mixture was heated at 210° C. for 20 min in a nitrogen atmosphere. The melt was then scooped from the reaction vessel with the aid of a spatula and allowed to cool to room temperature. This afforded a semi-crystalline mass which was sieved as in Example 5. The remaining material had a Tm of 219° C. and a Tg of 97° C.

The material was then subjected to solid state polymerization in a nitrogen atmosphere according to the following protocol:

150° C., 1 hour,
190° C., 3 hours,
210° C., 2 hours,
220° C., 2 hours,
240° C., 2 hours.

The product, which was removed from the reactor, was the desired branched polycarbonate having a Tg of 145° C., a Tm of 278° C., a Mw of 45,900 and a Mn of 13,440. The presence of CODDA branching was confirmed by proton nuclear magnetic resonance spectroscopy. Analysis showed 3% (by weight) gel formation, also evidence of branching.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. The tricarboxylic acid, 9-carboxy-1,18-octadecanedioic acid.

2. A process for making an aliphatic tricarboxylic acid having the formula

$$HOOC-R^1-\underset{\underset{COOH}{|}}{CH}-R^2-COOH, \tag{I}$$

wherein each of $R^1$ and $R^2$ is independently a divalent aliphatic hydrocarbon radical containing about 5–10 carbon atoms, which comprises the steps of (a) converting an olefinic monocarboxylic acid to an olefinic dicarboxylic acid by biotransformation in the presence of a yeast; and (b) carboxylating the olefinic dicarboxylic acid to a tricarboxylic acid with carbon monoxide and water in the presence of a catalyst.

3. The process of claim 2 wherein the catalyst comprises a palladium compound.

4. The process of claim 2 wherein the yeast is a strain of *Candida tropicalis.*

5. The process of claim 2 wherein the tricarboxylic acid is 9-carboxy-1,18-octadecanedioic acid.

6. A process for making 9-carboxy-1,18-octadecanedioic acid, which comprises the steps of (a) converting oleic acid to 1,18-octadec-9-enedioic acid by biotransformation in the presence of a strain of *Candida tropicalis* yeast; and (b) carboxylating 1,18-octadec-9-enedioic acid to 9-carboxy-1,18-octadecanedioic acid with carbon monoxide and water in the presence of palladium chloride-triphenylphosphine catalyst.

* * * * *